United States Patent [19]
Lichtenberg et al.

[11] Patent Number: 4,757,315
[45] Date of Patent: Jul. 12, 1988

[54] METHOD AND APPARATUS FOR MEASURING DISTANCE

[75] Inventors: Christopher L. Lichtenberg; Paul W. Shores, both of Houston; Herbert S. Kobayashi, Webster, all of Tex.

[73] Assignee: The United States of America as represented by the Administrator of the National Aeronautics and Space Administration, Washington, D.C.

[21] Appl. No.: 831,193

[22] Filed: Feb. 20, 1986

[51] Int. Cl.⁴ .............................. G01S 13/74
[52] U.S. Cl. ...................... 342/125; 342/43; 342/51; 342/127
[58] Field of Search ............ 342/5, 6, 30, 42–51, 342/125, 127, 32, 187

[56] References Cited
U.S. PATENT DOCUMENTS
3,243,812  3/1966  Williams .................. 342/127 X
4,170,773  10/1979  Fitzsimmons et al. ............. 342/42
4,314,373  2/1982  Sellers ........................ 342/51 X Primary Examiner—Theodore M. Blum
Assistant Examiner—Bernarr Earl Gregory
Attorney, Agent, or Firm—Hardie R. Barr; John R. Manning; Edward K. Fein

[57] ABSTRACT

A signal is transmitted from a first location to a remote second location where a target carrying a transponder is positioned. The transponder re-radiates the signal to the first location where it is received. A phase comparator generates from the transmitted and received signals a measurement of their phase difference which is functionally related to the distance between the first and second locations. In one embodiment, the transponder is a passive parametric oscillator, being powered by energy received from the transmitted signal, which generates and transmits a subharmonic of the transmitted signal.

18 Claims, 2 Drawing Sheets

METHOD AND APPARATUS FOR MEASURING DISTANCE

ORIGIN OF THE INVENTION

The invention described herein was made by employees of the U.S. Government and may be manufactured and used by and for the government of the United States of America for governmental purposes without the payment of any royalties thereon or therefor.

TECHNICAL FIELD

My invention relates to systems for measuring distances and, more particularly, relates to methods and apparatus for phase interferometric derivation of the range of a remote object.

BACKGROUND OF INVENTION

Electronic systems have long been known for measuring range of a target object, such as the various radar systems well known in the art. These systems most commonly operate on the principle of first transmitting electromagnetic energy to the object, detecting a return wave of electromagnetic energy reflected from the object, and then measuring the elapsed time it takes for the wave to have traversed the distance to the object and back. This time is then related to the distance to the object, given the known propagation rate of the wave.

Yet another such system illuminated the target with a continuous wave radar signal. A phase comparison circuit compared the phases of the transmitted and received waves and thence generated a phase difference signal therefrom as being indicative of the range to the object. A general discussion of such radar phase interferometry methods of range detection may be found in *Introduction to Radar Systems*, McGraw Hill Book Co., 1962, by M. Skolnik, which is incorporated by reference.

One problem associated with these systems was that the reflected wave frequently included spurious harmonic distortion and interference or background "clutter" arising from such things as the non-linear diode action in metallic junctions of man-made objects, such objects which generated and transmitted multiples of the transmitter frequency to the receiver. This rendered it difficult to detect the information portion of the received signal attributable to the transmitted signal.

Accordingly, ranging systems designers began to seek way to reduce this problem as, for example, by improving the strength of the reflected signal. This was accomplished by various means including the provision of signal reflectors and transponder means for actively re-transmitting the received signal from the object.

A representative such system which illustrates some of the disadvantages of the prior art may be seen disclosed in U.S. Pat. No. 4,170,773 to Fitzsimmons, et al. In this system, a transponder at the target was provided for actively reflecting the transmitted wave. This required local oscillator, mixer, and phase lock loop circuitry as well as a source of power. Such an approach resulted in associated problems of limited lifetime and reliability due to notorious high failure rate of amplifiers, oscillators, and the like which were called for, limited portability and flexibility in terms of operating frequency, and higher costs due to the number of components required.

Moreover, such a system did not provide any mechanism for operation of the transponder in a phasecoherent frequency divide-down mode, but rather employed the aforementioned mixers and the like, giving rise to problems of inexact frequency division and control of the local oscillator frequency and phase offset.

Thus, a distance measurement system was highly sought after which was extremely accurate, easily scaleable to a variety of frequencies, relatively immune to harmonic distortion and interference, particularly with respect to integer multiples of the transmitted frequency, and wherein the transponder was of an inexpensive, light, simple, reliable, and easily-fabricated construction requiring no active power sources, phase lock loops, local oscillators, mixers, amplifiers, or the like.

These and other disadvantages of the prior art are overcome by the present invention.

DISCLOSURE OF THE INVENTION

A first continuous electromagnetic wave signal $S_1$ at a first frequency $f_1$ is transmitted from a first location. A transponder carried by a target object positioned at a second remote location receives the transmitted signal, phase-coherently divides the $f_1$ frequency and phase thereof, and re-transmits the transmitted signal as a second continuous electromagnetic wave signal $S_2$ at a lower second frequency $f_2$ which is a subharmonic of $f_1$. The re-transmitted signal is received at the first location where a measurement of the phase difference is made between the signals $S_1$ and $S_2$, such measurement being indicative of the distance between the first and second locations.

In a preferred embodiment, the transponder is a passive divide-by-two parametric oscillator employing the energy from the transmitted signal $S_1$ incident thereon to generate the re-transmitted signal $S_2$. The re-transmitted signal $S_2$ is thus phase coherent with and at a subharmonic frequency of that of the transmitted signal $S_1$ received by the transponder whereby, in one embodiment, $f_2 = f_1/2$.

Accordingly, with respect to the transponder, first and second antennas are provided for receiving and transmitting the first and second signals $S_1$ and $S_2$, respectively. A voltage-dependent reactant means which may take the form of a varactor diode is provided for generating signals at subharmonics of $f_1$ such as the $S_2$ signal at $f_2$. Input circuitry means is provided in series between the first transponder antenna and the reactance means for optimizing transmission of energy in the signal $S_1$ at the $f_1$ frequency from the antenna through the input circuit means to the reactance means while reflecting energy at the frequency $f_2$ from the reactance means back towards the reactance means.

In like manner, output circuit means is provided in series between the second transponder antenna and the reactance means for optimizing the transmission of energy at the subharmonic frequency $f_2$ generated in the reactance means to the output circuitry whereby such energy will be transmitted by the second antenna while reflecting energy at the $f_1$ frequency back to the reactance means.

BRIEF DESCRIPTION OF THE DRAWINGS

The details of my invention will be described in connection with the accompanying drawings, in which.

BEST MODE FOR CARRYING OUT THE INVENTION

Figure 1:
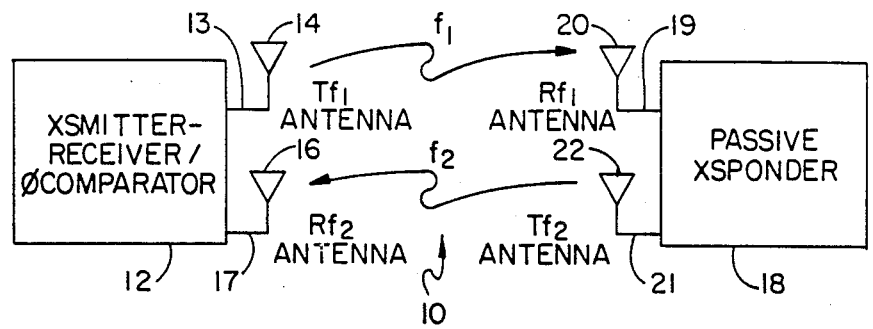
FIG. 1 is a schematic block diagram illustrating the distance measuring system of the present invention.

First a general description will be given of the distance measuring system 10 of the present invention as depicted in FIG. 1. This will be followed by a description of the theory of operation of the system, and then a more detailed description of the components and features of the system.

First, with reference to FIG. 1, there may be seen depicted therein a schematic block diagram of the distance measuring system 10 of the present invention. A transmitter-receiver/phase comparator circuit 12 is provided which generates a continuous wave electromagnetic signal $S_1$ at a frequency $f_1$ which is delivered on a suitable transmission line 13 to a transmitting antenna 14. A receiving antenna 16 is also provided which delivers received signals on another appropriate transmission line 17 to the transmitter-receiver/comparator 12 for purposes to be hereinafter described. For convenience, the latter will hereinafter be referred to as comparator 12.

Still referring to FIG. 1, at a location remote from the circuitry 12, a passive transponder 18 is positioned, as well as a corresponding receiving and transmitting antennas 20 and 22, respectively, which are interconnected to the transponder 18 by means of conventional respective transmission lines 19 and 21. It will be noted in passing that the transponder 18 and antennas 20 and 22 are located at an unknown distance "d" from the comparator 12 and antennas 14 and 16 to be determined by the system. The purpose of the first antenna 20 of the transponder is to receive the first signal $S_1$ transmitted at a frequency $f_1$ from the first antenna 14 of the comparator circuit 12 and to deliver this signal on the transmission line 19 to the transponder circuit 18.

In the transponder circuit 18, a second signal $S_2$ is passively generated at a subharmonic frequency $f_2$ of the frequency $f_1$ of the thus-received $S_1$, the phase of this $S_2$ signal being phase-coherent or "phase-locked" to the phase of the $S_1$ signal. This $S_2$ signal is delivered on the transmission line 21 to the second antenna 22 of the transponder circuit 18 for transmission to and receipt by the second antenna 16 of the comparator circuit 12. Upon receipt of this signal $S_2$, the second antenna 16 delivers the received signal on transmission line 17 to the comparator circuit 12. In a manner which will be more clearly demonstrated hereinafter with reference to the theory of operation of the system 10, the comparator circuit 12 will include means for generating a measurement signal corresponding to the magnitude of the phase difference between the signal $S_1$ as it is transmitted by the antenna 14 and the phase of the $S_2$ signal as received by the second antenna 16 of the comparator 12. It may be shown that this phase difference is directly related to the distance separating the comparator circuit 12 with its associated antennas from the transponder circuit 18 with its corresponding antennas. Thus, this phase difference measurement signal generated by the comparator circuit 12 may then be utilized in any desired manner as, for example, by conversion and calibration to display the actual distance separating circuits 12 and 18 as opposed to merely the phase angle.

It will be noted in passing that because the system 10 measures an unknown distance between the comparator circuit 12 and its associated antennas and the transponder circuit 18 and its antennas, that the comparator circuit 12 will be located at a desired observation point and the transponder circuit 18 may desirably be carried by a target object the distance to which from the observation point is desired. Accordingly, the invention admits of incorporating the transponder circuit 18 with its associated antennas in any desired target object and is not intended to be limited to any particular application. The system of the present invention may be beneficially employed in such diverse applications as proximity operations in space, such as automatic docking of spacecraft or the like, aircraft landing systems, surveying, maneuvering of ships, and for purposes of providing homing beacons for smaller water craft. Thus, the transponder circuit 18 and associated antennas will, dependent upon the particular application, be adapted to be readily mounted at an appropriate location on spacecraft, boats, or the like, whereby signals may readily be received from and transmitted to the comparator circuit 12 by the transponder circuit 18.

It will also be noted that for convenience hereinafter, the comparator circuit 12 and associated antennas will collectively be referred to as the base system, whereas the transponder circuit 18 and its associated antennas will collectively be referred to as the transponder system.

THEORY OF OPERATION

Now that a general description of the operation of the measuring system 10 has been given, the basic operational theory thereof is hereafter presented. As a practical matter, it will be assumed herein that the base and its antennas as well as the transponder circuit 18 and its antennas operate as point sources separated by a distance "d".

First, as previously noted a sinusoidal continuous wave electromagnetic signal $S_1$ at a frequency $f_1$ is transmitted from the first antenna 14 of the base 12 and propagated toward the first antenna 20 of the transponder circuit 18. The wave is of the form $$S_1(t) = \cos(2\pi f_1 t) \qquad \text{Equation 1}$$

At a distance "d" along a straight line from the base system to the point where the transponder system is located, the radiated field from antenna 14 at the point where it is received by the antenna 20 is given by $$S_1(t) = \cos(2\pi f_1 t - \beta_1 d) \qquad \text{Equation 2}$$

where $$\beta_1 = \frac{2\pi f_1}{C} = \frac{2\pi}{\lambda_1} = \text{the propogation phase constant accounting for phase delay of the } S_1 \text{ signal arising from its propagation over distance } d$$

c = the speed of light
$\lambda_1$ = free-space wavelength of $S_1$

This signal $S_1$ received by the first antenna 20 of the transponder system is modified by the transponder system as follows. As previously noted, the transponder system includes means whereby a sinusoidal continuous wave electromagnetic wave $S_2$ at a frequency $f_2$ is passively generated by a parametric oscillator or the like and derived from the $S_1$ signal. This signal $S_2$ will be at a frequency $f_2$ which is a subharmonic of $f_1$ and phase coherent or phase locked to the phase of the $S_1$ signal received by the antenna 20. In a preferred embodiment, $f_2 = f_1/n$, where n is an integer and preferably n=2, whereby transponder 18 may be seen to be operating as a frequency halver.

With the foregoing in mind, upon performing the aforementioned frequency division, transponder circuit 18 generates the signal $S_2$ which is delivered to antenna 22 on line 21 and transmitted back to the antenna 16 of the base system. This signal $S_2$, as transmitted from the transponder antenna 22, may thus be seen to be of a frequency ½ of that of $f_1$, with ½ the phase delay of signal $S_1$, and thus of the form $$S_2(t) = \text{Cos}\left[\frac{2\pi f_1 t - \beta_1 d}{2} + (0 \text{ or } \pi)\right] \quad \text{Equation 3}$$

The "0 or $\pi$" arises from the fact that the initial phase state of the transponder circuit 18 is unknown, e.g., at the transponder system the $S_2$ signal thus generated may be in phase or 180° out of phase with the received $S_1$. This ambiguity may be resolved in a number of manners well known in the art such as that hereinafter described, including FM or AM modulations, initial system turn on calibration, or the like.

When the $S_2$ signal is transmitted from the antenna 22 to the base system, again over the distance "d" separating the base and transponder systems, yet an additional phase delay is introduced between the $S_2$ signal as transmitted from antenna 22 and received by antenna 16 located the distance "d" therefrom. This is again due to finite electromagnetic wave propagation time from the transponder system to the base system. The $S_2$ signal, as received by the antenna 16 from the transponder antenna 22, will thus be seen to be of the form $$S_2(t) = \text{Cos}\left[\frac{2\pi f_1 t - \beta_1 d}{2} + (0 \text{ or } \pi) - \beta_2 d\right] \quad \text{Equation 4}$$

where $\beta_2 = \beta_1/2$

Equation 4 may be rewritten in the form $$S_2(t) = \text{Cos}\left[\frac{2\pi f_1 t}{2} - \beta_1 d + (0 \text{ or } \pi)\right] \quad \text{Equation 5}$$

Comparison of Equation 5, representing the signal $S_2$ received by the base system antenna 16 from transponder antenna 22 and Equation 1, which represents the signal $S_1$ transmitted by antenna 14 of the base system to transponder antenna 20, indicates that a phase lag of ($\beta_1 d + 0$ or $\pi$) exists between the signals $S_1$ and $S_2$.

This phase term is significant for several reasons. First, it will be recalled that $\beta_1$ is a propagation constant which varies only with $f_1$, the frequency of the transmitted signal $S_1$. Thus, the total phase lag detected between the signal $S_1$ transmitted by antenna 14 and the signal $S_2$ as received by antenna 16 will be seen to be directly proportional to the distance "d" separating the base and transponder systems which is desired to be known. By knowing the magnitude of this phase difference and converting it to a signal corresponding to units of length, this signal may be used to provide a measurement and indication of the desired distance "d". This signal may be utilized in any convenient manner desired such as in alpha-numeric form on a display video screen, in a distance meter, or the like.

The other significance of the phase term hereinbefore described is the presence of the 0 or $\pi$ term and the ambiguity thus introduced in measurement of the distance "d" due to uncertainty of the phase state of the transponder 18. This may be resolved by several methods well known in the art, such as that which follows shortly.

One problem with the aforementioned approach is that a review of Equations 1 and 5 reveals that the $S_1$ and $S_2$ signals, in addition to having a relative phase difference at the base system which is desired to be detected, are at different frequencies. For ease of phase detection, as known in the art, it is in some applications desirable for these two signals to still maintain the desired phase difference but to be of the same frequency as will hereinafter be apparent at the phase detection stage. The embodiment of comparator circuit 12, depicted in FIG. 4, accomplishes this, the theory of which will hereinafter follow with reference, when appropriate, to components of the comparator circuit 12 depicted in FIG. 4. It will be noted, however, that a significant benefit to the $S_2$ signal being at a subharmonic frequency of the $S_1$ signal is that spurious interference and detection of $S_2$ may thus be avoided by conventional limited bandwidth antenna design, filtering and the like well known in the art.

Figures 4, 5, 6:
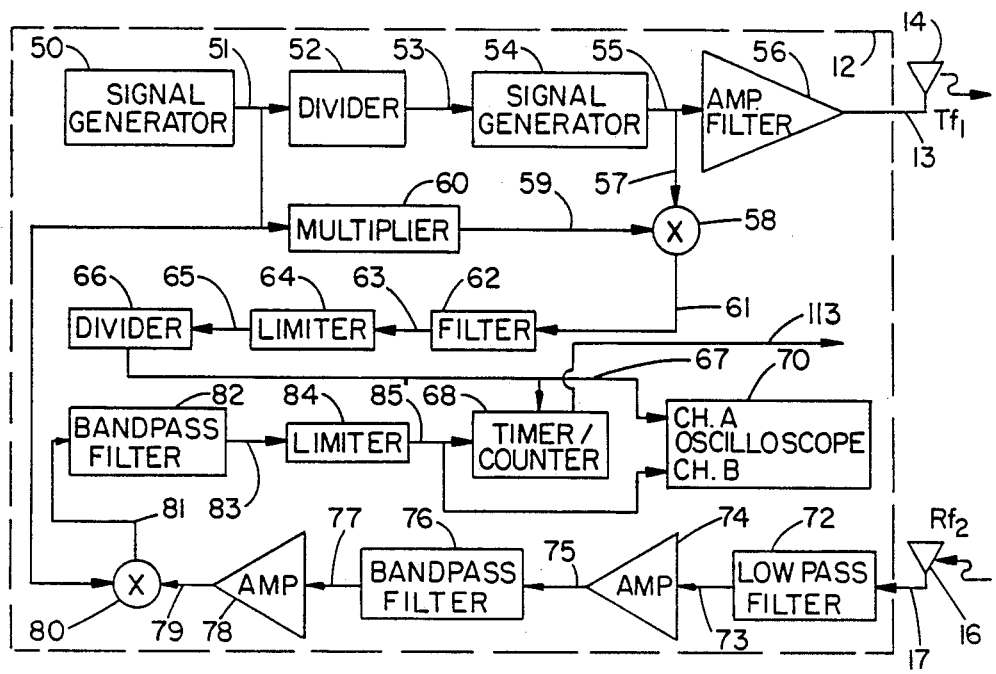
FIG. 4 is a more detailed block diagram of one embodiment of the transmitter-receiver/phase comparator portion of the system depicted in FIG. 1.
FIG. 5 is a schematic diagram depicting an equivalent circuit for the passive transponder portion of the system depicted in FIG. 1.
FIG. 6 is another schematic diagram of an embodiment of the passive transponder portion of the system depicted in FIG. 1.

First, the reference frequency of the original signal $S_1$ as represented by Equation 1 and signal 55 in FIG. 4, may be translated down or down-converted by mixing in the mixer 58 with input 59 (without affecting the phase thereof), whereby the output 61 of mixer 58 is $$S_1' = \text{Cos}(\omega t) \times \text{Cos}(\omega + \Delta\omega)t \quad \text{Equation 6}$$

This $S_1'$ becomes, after filtering by filter 62, output 65 of the form $$S_1' = \text{Cos } \Delta\omega t \quad \text{Equation 7}$$

After frequency division by two by the divider 66 in comparator circuit 12, this signal thence finally becomes $$S_1' = \text{Cos}\frac{\Delta\omega}{2} t \quad \text{Equation 8}$$

which is presented to timer/counter 68 and oscilloscope 70.

The $S_1$ signal transmitted by antenna 14 will be of the form shown in Equation 1, i.e.

$$S_1 = \text{Cos}(\omega + \Delta\omega)t \qquad \text{Equation 9}$$

Due to phase delay, this signal $S_1$ as received by transponder antenna 20 will thus be of the form $$S_1 = \text{Cos}\left(\omega + \Delta\omega t - \frac{2\pi d}{\lambda}\right) \qquad \text{Equation 10}$$

After frequency and phase division by the transponder, this $S_1$ signal at antenna 22 will take the form $$S_2 = \text{Cos}\left[\frac{(\omega + \Delta\omega)}{2}t - \frac{\pi d}{\lambda}\right] \qquad \text{Equation 11}$$

Upon receipt by base system antenna 16, this $S_2$ signal will be of the form $$S_2 = \text{Cos}\left[\frac{(\omega + \Delta\omega)}{2}t - \frac{2\pi d}{\lambda}\right] \qquad \text{Equation 12}$$

After filtering by filter 76, the output 77 of filter 76 delivered to mixer 80 as amplifier output 79 is $$S_2 = \text{Cos}\left[\frac{\Delta\omega t}{2} - \frac{2\pi d}{\lambda}\right] \qquad \text{Equation 13}$$

Mixing of this signal with the Cos $\omega t/2$ output 51 of signal generator 50 gives $$\text{Mixer Output } 81 = \text{Cos}\frac{\omega t}{2} \times \text{Cos}\left[\frac{\Delta\omega t}{2} - \frac{2\pi d}{\lambda}\right] \qquad \text{Equation 14}$$

which, after filtering by filter 82 becomes, as limiter output 85

$$\text{Limiter Output } 85 = \text{Cos}\left[\frac{\Delta\omega t}{2} - \frac{2\pi d}{\lambda}\right] \qquad \text{Equation 15}$$

Comparison of Equations 8 and 15 indicates that two output signals 67 and 85 have thus been generated of equal frequency as desired differing only by the phase term which carries the information regarding the distance "d" separating the base and transponder systems.

These signals 67 and 85 may be delivered to the aforementioned timer/counter 68 or two channel oscilloscope 70 for measuring magnitude of this phase difference as desired.

The phase difference displayed or measured by the timer/counter 68 or oscilloscope 70 between the signals of Equations 8 and 15 may be converted to the desired distance "d" as follows with reference to a specific example.

In one embodiment, the following parameters were selected:

$f_1 = 30.01$ MHz
$\lambda_1 = 32.78'$
$\Delta f_1/2 = 5$ kHz
$\Delta f_1/2 = 200$ microseconds From the foregoing, it will be appreciated that for movement of the transponder system of one wavelength $\lambda_1$ or 32.78', a 200 microsecond phase delay would be detected by the timer/counter 68. This, in turn, gives rise to a conversion factor for converting seconds of phase delay to distance of movement of the transponder system relative to the base system of 200 microseconds/32.78' or, in other words, 6.101 microseconds/feet. Thus, for each change in distance "d" of 1', the time difference measured by the timer/counter 68 would be 6.101 microseconds.

Now that a basic understanding of the theory of operation of the measurement system 10 of FIG. 1 has been given, a more detailed disclosure of the various component parts thereof will hereinafter follow. First, with reference to FIG. 2, a more detailed block diagram of a representative comparator circuit 12 of FIG. 1 will be seen. It will be recalled that the basic purpose of the comparator circuit 12 is to generate and transmit a first signal $S_1$ at a frequency $f_1$ to the transponder system, to receive a signal $S_2$ at a subharmonic frequency $f_2$ of $f_1$ frequency transmitted by the transponder system, and to thence compare the phase difference between the $S_1$ signal as transmitted from the comparator circuit 12 and the $S_2$ signal as received by the comparator circuit 12, this phase difference being indicative of the distance "d" separating the base and transponder systems.

Figure 2:
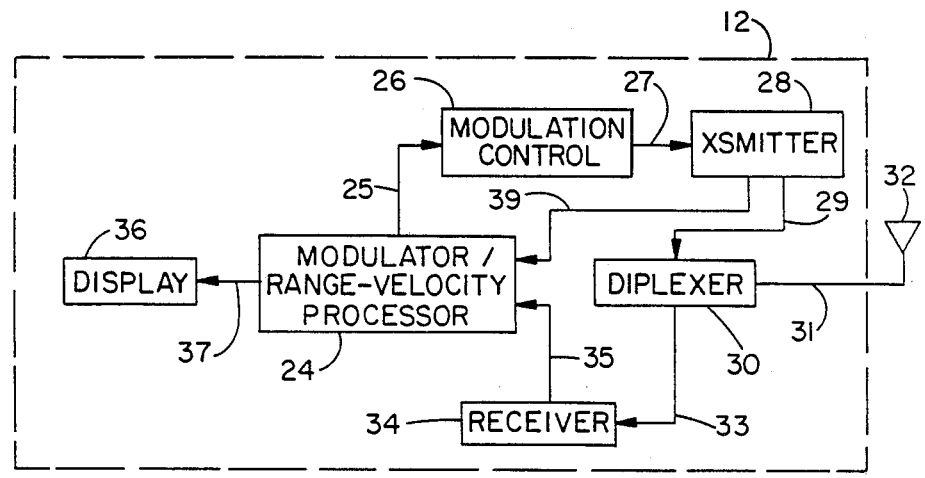
FIG. 2 is a block diagram of the transmit-receive/phase comparator portion of the system depicted in FIG. 1.

Accordingly, with reference to FIG. 2, a transmitter 28 is provided for generating the $S_1$ signal at a frequency $f_1$, the output of which is delivered as signal 29 to a diplexer 30. The diplexer 30, in turn, delivers this signal 29 on transmission line 31 to a transmitter/receiver antenna 32 whereupon the signal $S_1$ is transmitted to the transponder system.

It will be recalled that the transponder system will receive this signal $S_1$, and passively generate a subharmonic thereof at a frequency $f_2$ which will be transmitted back to the base system depicted in FIG. 2. The antenna 32 will receive this signal transmitted from the transponder system, and deliver it on transmission line 31 through the diplexer 30 as signal 33 to an appropriate receiver 34. The signal $S_2$ thus received by the receiver 34 will be delivered as signal 35 to a modulator/rangevelocity processor 24. A portion of the transmitted signal $S_1$ will be delivered on line 39 from the transmitter 28 to this processor 24. The processor 24 will, in part, compare these signals 39 and 35 corresponding to signals $S_1$ and $S_2$, and derive a measurement of the phase difference between the signals. It will be recalled that this phase difference signal will correspond to the distance between the base and transponder systems but that a conversion factor must be applied to the phase difference signal in order to yield a direct indication of distance. Accordingly, one of the purposes of the processor 24 is to operate on the phase difference signal converting it to a distance signal 37 which may be delivered to an appropriate end user or utility device such as numerical display 36 or the like as desired. It will be appreciated that the distance measurement signal derived by the herein disclosed system may be used for numerous purposes other than merely for visual display of the magnitude thereof. The signal may be used as an alarm or control signal in a crash avoidance system, as but one example. The subject invention is thus not intended to be limited to any particular application.

As yet another illustration of the system's versatility, from successive measurements of the distance "d" separating the base and transponder systems over time, it will be appreciated that in addition to measuring range, the relative velocity between the two systems may be derived. Accordingly, in another embodiment, it may be desirable for the processor 24 to store successive distance measurements and relate them to an internal clock whereby in addition to respective range measurements between the base and transponder systems, a relative velocity between the systems may be derived and delivered as signal 37 for appropriate display on the display 36.

It will be recalled that in some instances the distance measuring system may encounter range ambiguity. Accordingly, a modulation control circuit 26 is provided which receives an information signal 25 from the processor 24 and delivers an output 27 modulating the transmitter 28 in a manner to be hereinafter described in order to remove such ambiguity.

Figure 3:
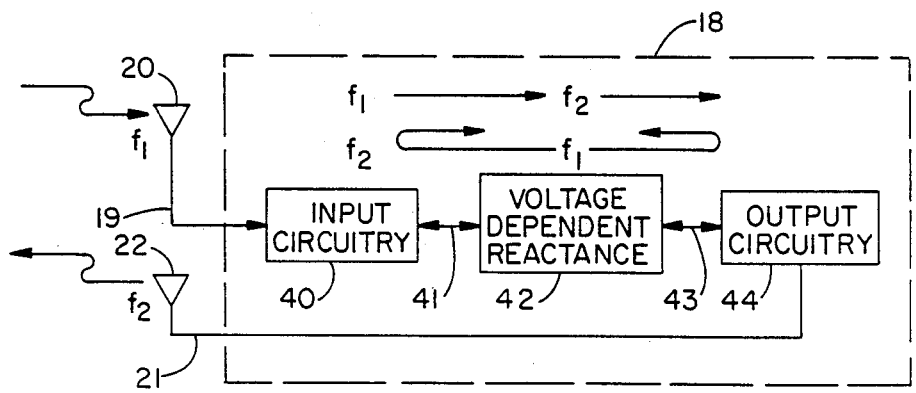
FIG. 3 is a block diagram of the passive transponder portion of the system depicted in FIG. 1.

Referring now to FIG. 3, a schematic illustration of the transponder system of FIG. 1 will be seen depicted therein. It will be recalled that a primary purpose of the transponder system is to receive a signal $S_1$ at a frequency $f_1$ transmitted from the base system, to passively generate a subharmonic thereof at a frequency $f_2$, and thence to transmit this subharmonic as signal $S_2$ at the frequency $f_2$ back to the base system. Moreover, it will further be recalled that the transponder system will generate such a signal $S_2$ which is phase coherent with the phase of the $S_1$ as received by the antenna 20.

With the foregoing in mind, the transponder circuit 18 depicted in FIG. 3 will preferably be seen to be comprised of an input circuit 40, a voltage dependent reactance 42, and an output circuit 44 disposed in series. The $S_1$ signal received by the antenna 20 will be delivered on transmission line 19 to the input circuit 40. In like manner, the output signal $S_2$ generated by the transponder circuit 18 will be delivered from the output circuit 44 on transmission line 21 to the transmitting antenna 22 of the transponder system for transmission to the base system.

The reactance 42 is shown in FIG. 3 as being functionally interconnected by lines 41 and 43 to input circuit 40 and output circuit 44, respectively. It will be appreciated that this is for purposes of functionally describing the purposes and operations of the input circuit 40, reactance 42, and output circuit 44. More particularly, the purpose of input circuit 40 is to optimize flow of energy at the frequency $f_1$ received on line 19 through the input circuit 40 and to the reactance 42 as shown by the interconnection 41 while, at the same time, reflecting any energy at frequency $f_2$ back to the reactance 42. This may be seen from the arrows accompanying the $f_1$ and $f_2$ designations.

Inasmuch as energy at the $f_1$ frequency is delivered from the input circuit 40 to the reactance 42, the purpose of the reactance 42 is to generate subharmonics at a frequency $f_2$ in response to this energy delivered at the frequency $f_1$ to the reactance 42 from the input circuit 40.

The purpose of the output circuit 44 is to optimize coupling of energy generated by the reactance 42 at the frequency $f_2$ through the output circuit 44 and to the antenna 22 on line 21 while, at the same time, reflecting any energy at the $f_1$ frequency from the reactance 42 to the output circuit 44 back to the reactance 42.

From the foregoing, it will be appreciated that the diagram depicted as transponder circuit 18 in FIG. 3 may be implemented in a number of ways and is only intended to illustrate the function and operation of the transponder circuit 18. For example, the impedance matching function of the input circuit 40 between the transmission line 19 and antenna 20 on the one hand and the reactance 42 on the other hand, may be achieved by various arrangements of passive elements such as inductors, capacitors, and transmission lines which may be discrete or distributed elements or a combination thereof. In like manner, the function of the output circuit 44 in impedence matching between the reactance 42 and the transmission line 21 and antenna 22 may also be implemented by a number of different embodiments employing the aforementioned passive inductors, capacitors, transmission lines, and the like, either in discrete or distributed element form. In like manner, the voltage dependent reactance 42 may be implemented by employing various different components although in a preferred embodiment, this reactance 42 will take the form of a varactor diode.

From the foregoing with respect to the description of the function of the transponder circuit 18, it will be appreciated that in general the transponder circuit 18 provides a means for generating energy at a subharmonic of the input frequency of a received signal delivered thereto. Moreover, it is a feature of the present invention in one embodiment that the transponder circuit 18 generate such a subharmonic at $\frac{1}{2}$ the input frequency which is phase locked to the fundamental input frequency and moreover that the transponder circuit 18 generate such subharmonics in a passive manner, i.e., by utilizing the energy in the input signal incident thereon at the input frequency, thus obviating the need for power supplies and the like. For a general discussion of generation of subharmonics reference is made to *Generation of Harmonics and Subharmonics at Microwave Frequencies with PN Junction Diodes,* and *Proceedings of the IRE,* October 1959, by Leenov, D. and Uhlir, A., Jr., which are incorporated herein by reference.

As an example of yet another approach for achieving the hereinbefore described purposes of the transponder circuit 18, reference is made to "A New Slot-line - Microstrip Frequency Haver", Publication No. 0149645X/85/000-0683 appearing in 1985 *IEEE MTT-S Digest,* by Kalives, Grigorios, A., and Harrison, Robert G., Department of Electronics, Carlton University, Ottawa, Ontario, Canada, K1S 5B6, which is also incorporated herein by reference. The latter reference discloses a technique which may be applicable to the present invention wherein the passive transponder circuit 18 may be implemented to provide a passive in-phase frequency halver by means of a combination of the aforementioned varactor diodes and slotline and microstrip transmission-line sections whereby discrete components for the input and output circuitry 40 and 44 are avoided.

In a preferred embodiment, the components comprising the transponder circuit 18 will preferably be designed so as to generate a subharmonic $f_2$ which is $\frac{1}{2}$ the frequency $f_1$ of the signal $S_1$ incident upon the antenna 20. One reason for providing frequency division by the transponder circuit 18 is to facilitate isolation of the signals transmitted and received by the base system by means of bandpass filters and the like. Yet an additional reason for providing such frequency division by the transponder circuit 18 is to provide immunity from harmonic distortion or interference in the base system where the interfering harmonic is a whole multiple of the transmit frequency. Thus, whereas the frequency of the transmitted signal $S_1$ is $f_1$, the passive transponder 18 is designed so as to receive this $f_1$ signal and to generate a subharmonic preferably at $f_1/2$. Moreover, the transponder 18 is further designed to transmit this second signal $S_2$ at the subharmonic frequency $f_2$ to the base system which may preferably have a narrow bandwidth receiver design specifically only to receive such subharmonics lower than the original $f_1$ frequency transmitted by the base system. Whereas in a preferred embodiment the parametric oscillation and transmission of the $f_2$ output frequency is at ½ the input frequency $f_1$ rate, it is specifically contemplated that the transponder circuit 18 of the present invention may be designed to act as a divide by 3 or higher transponder 18 as desired.

Now that a general discussion has been provided of the construction and operation of a transponder circuit 18 in accordance with the present invention, a more detailed disclosure of one embodiment of the phase comparator circuit 12 of the present invention will be provided. First, an appropriate signal generator 50 will generate a continuous wave signal from its oscillator at a nominal 15 MHz frequency in the form of Cos ($\omega t/2$), this signal 51 being delivered to a frequency divider circuit 52 wherein it may be divided by 3, resulting in a 5 MHz output signal 53. This output signal 53 is, in turn, delivered to the reference clock input of an appropriate frequency synthesizer type signal generator 54 such as a Hewlett-Packard 8660C generator. The generator 54 may be adjusted so as to translate the 5 MHz reference clock input frequency signal 53 to a desired frequency such as 30.01 MHz which will be recognized as the aforementioned $f_1$ main $S_1$ signal frequency, or Cos ($\omega + \Delta\omega$) t.

The output 55 of the signal generator 54 at this $f_1$ rate is thence delivered to an amplifier/filter 56 which may amplify this signal for transmission and filter it to insure that the output of the amplifier/filter 56 is comprised primarily of the fundamental frequency $f_1$. This output is thence delivered on transmission line 13 to an appropriate antenna 14 for subsequent transmission to the transponder system. The antenna 14 may be designed in accordance with well known techniques consistent with good engineering practice so as to maximize transmission of the signal $S_1$ delivered thereto to the transponder system. In one form, the antenna 14 may be a modified CB whip or dipole radio-type antenna adapted to efficiently transmit signals at the fundamental $f_1$ frequency. Due to the frequency multiplication provided by the signal generator 54, it will be noted that the generator output 55 delivered to the antenna 14 and to a mixer 58 as output signal 57 will be of the form Cos ($\omega + \Delta\omega$) t, accounting for the increased frequency introduced by the signal generator 54. From the foregoing, it will be appreciated that radiating from the antenna 14 will be a continuous wave electromagnetic wave signal $S_1$ of this form, at a fundamental $f_1$ frequency of 30.01 MHz.

It will be recalled that due to phase delay introduced by separation of the base and transponder systems, this signal $S_1$ as received at antenna 20 will be of the form $$\text{Cos}\left[(\omega + \Delta\omega)t - \frac{2\pi d}{\lambda}\right] \qquad \text{Equation 16}$$

Also from the foregoing discussion relative to the function of the transponder circuit 18, it will further be appreciated that in response to this $S_1$ signal received by the transponder circuit 18, a second signal $S_2$ will be passively generated therefrom at a subharmonic frequency $f_2$ below that of the $f_1$ frequency. In the preferred embodiment, this frequency $f_2$ will be ½ $f_1$. Upon radiation of the $S_2$ signal from the transponder antenna 22, this signal will be received by the antenna 16 of the base system and delivered on transmission line 17 to the comparator circuit 12.

Still referring to FIG. 4 and with reference to the aforementioned theory of operation of the system, the $S_2$ signal received from the antenna 22 of the transponder system will be appreciated to be of the form $$\text{Cos}\left[\frac{(\omega + \Delta\omega)}{2}t - \frac{2\pi d}{\lambda}\right] \qquad \text{Equation 17}$$

Comparison of this to the $S_1$ signal transmitted by the antenna 14 indicates the frequency division operation provided by the transponder circuit 18 as well as the introduction of phase delay into the signal transmitted from the base system to the transponder system as well as phase delay introduced by the re-transmission of this signal divided down from the transponder system back to the base system. It will be recalled that this phase delay introduced into the round trip traversal of electromagnetic energy from the base system to the transponder system and back to the base system may be seen to be of the form $$\frac{2\pi d}{\lambda}$$

where
 d=the distance separating the base and transponder systems, and
 $\lambda$=the wavelength of the $S_1$ signal.

A lowpass filter 72 is tuned to the $f_2$ frequency so as to insure that its output 73 is comprised substantially of the $f_2$ component corresponding to the signal $S_2$ transmitted by the antenna 22 of the transponder circuit 18. This output 73 is delivered to an appropriate amplifier 74 for boosting the signal level thereof, whereupon the amplifier output 75 is thence delivered to a bandpass filter 76 having an output 77 delivered to an additional amplifier 78. The purpose of the various amplifiers and filters 72-78 is to insure, in accordance with conventional electronic engineering practice, that the output of the amplifier 79 is of a sufficient level for subsequent processing and is comprised substantially of the aforementioned $S_2$ signal at the frequency $f_2$. It will be recalled that in a preferred embodiment this $f_2$ frequency is ½ that of $f_1$, and accordingly, the output of amplifier 79 will be of the frequency $$\tfrac{1}{2} \times 30.01 \ MHz = 15.005 \ MHz$$

and will be of the frequency and phase delay as indicated above in Equation 17. It will be noted in passing that one function of the filter 76 is to provide isolation so that signals at the $f_1$ frequency as well as other noise signals at frequencies higher than the $f_2$ frequency will not be passed therethrough for processing.

Still referring to FIG. 4, the output 79 of the amplifier is delivered to an appropriate mixer 80 which also received as an input thereto the output 51 of the signal generator 50 which, it will be recalled, is nominally 15 MHz and of the form Cos ($\omega t/2$).

Upon the mixer 80 mixing down these 15 MHz and 15.005 MHz signals from outputs 51 and 79, respectively, a difference frequency of 5 kHz is generated as the output 81 of the mixer 80. This output 81 will include the phase difference term $2\pi d/\lambda$ reflecting the phase difference between the $S_1$ signal transmitted by the antenna 14 and the $S_2$ signal received by the antenna 16. This output 81 will be delivered to a bandpass filter 82 so as to filter out higher order frequencies present in the mixer output 81, resulting in an output of the form D—

$$\text{Cos} \frac{\Delta\omega t}{2} - \frac{2\pi d}{\lambda}$$

This output 83 is thence delivered to a limiter 84 having an output 85 which is, in turn, delivered to a timer/counter 68 and one channel of a conventional oscilloscope 70.

Still referring to FIG. 4, the output 51 of the signal generator 50 will also be delivered to a frequency multiplier 60. This multiplier 60 will multiply the 15 MHz frequency of the signal generator output 51 by two so as to be 30 MHz and of the form Cos ($\omega t$) which will be delivered to the signal mixer 58. It will be recalled that the other input 57 to the mixer 58 will be of the $f_1$ frequency of 30.01 MHz having the form Cos ($\omega + \Delta\omega$) t. Accordingly, the output 61 of the mixer 58 will be the difference frequency between the 30 MHz, input 59 and the 30.01 MHz input 57 or, in other words, 10 kHz. Moreover, this mixer output 61 will be of the form Cos ($\Delta\omega t$), and will be delivered to an appropriate bandpass filter 62. The output 63 of the filter 62 will thence be delivered to a limiter 64 having an output 65 which is delivered to a frequency divider circuit 66 which will divide the input frequency 65 by 2. Accordingly, the output 67 of the divider 66 will be appreciated to be of the frequency 5 kHz and of the form Cos ($\Delta\omega t/2$) which will be delivered to the timer counter 68 and channel A of the oscilloscope 70.

From the foregoing, it will be noted that one input 85 to the timer/counter 68 and one channel of the oscilloscope 70 will be a 5 kHz signal which includes phase difference between the signals transmitted and received by the antennas 14 and 16, respectively, such phase difference term being $2\pi d/\lambda$. Moreover, this output signal 85 will be of the aforementioned form D. Similarly, the other input to the timer/counter 68 and other channel of the oscilloscope 70 will be of an identical 5 kHz frequency but without a phase difference term. The purpose of the timer/counter 68 is to generate a measurement of this phase difference term of the two input signals 85 and 67 which are of the same frequency.

Accordingly, in one embodiment, the timer/counter 68 takes the form of a conventional start/stop counter circuit which counts the number of seconds between a positive-going 0 crossing of a reference signal 67 and the positive-going 0 crossing of the received signal 85. It will be noted that there are several ways to measure relative phase shift known in the art. Accordingly, by provision of the dual channel oscilloscope 70, these reference and received signals 67 and 85, respectively, may be simultaneously displayed on an oscilloscope 70 whereby the magnitude of the differences in the 0 crossing points of the two wave forms may be observed. It will be recalled that these phase differences detected by timer/counter 68 and/or oscilloscope 70 or other means well known in the art may be correlated to actually read in terms of distance D separating the base and transponder systems. Thus, a processor 24 such as that depicted in FIG. 2 may be provided for receiving this phase difference measurement signal generated, for example, from the timer/counter 68 and for generating therefrom a direct indication of this distance D as desired.

With reference to FIG. 5 now, an equivalent circuit may be seen depicted therein for achieving the hereinbefore described function of the transponder circuit 18. The previously described antenna 20 and transmission line 19 may be recognized as being provided for delivering the received signal $S_1$ from the base system antenna 14 on the transmission line 19 to the transponder circuit. In like manner, the previously described antenna 22 and transmission line 21 may also be seen depicted therein for transmitting the $S_2$ signal at the $f_2$ frequency generated by the transponder circuit 18 to the receiver antenna 16 of the base system.

With respect to the components of the transponder circuit 18 depicted in FIG. 5, a first resonant circuit has been provided comprised of a parallel arrangement of inductor 90 and capacitor 92, the components of which are selected in a conventional manner so as to resonant at or near the received frequency $f_1$ of the signal $S_1$. In like manner, a second resonant circuit comprised of parallel arrangements of capacitor 96 and inductor 98 is provided, such components being adjusted so as to resonant the parallel arrangement thereof at or near the $f_2$ frequency. One end of each such parallel resonant circuit is appropriately grounded as represented by grounding 91 and interconnected to the transmission line 21. The other end of the first resonant circuit is connected to the transmission line 19 and the cathode of a varactor diode 94. The other end of the second resonant circuit is connected to the anode of the varactor diode 94. Thus, a comparison of FIGS. 3 and 5 will reveal that the voltage dependent reactance 42 depicted in FIG. 3 may be seen as comprised of the varactor diode 94. In like manner, the input circuitry 40 of FIG. 3 may be seen to correspond to the first resonant circuit comprised of inductor 90 and capacitor 92. Still further the output circuit 44 of FIG. 3 will be seen to be comprised in FIG. 5 of the second resonant circuit formed by capacitor 96 and 98. In like manner to the more generalized discussion of FIG. 3 and the various components functionally depicted therein, in the embodiment of FIG. 5, the passive transponder circuit 18 will nevertheless in like manner provide the function of receiving incident energy in the signal $S_1$ at a frequency $f_1$ and generate in response thereto a signal $S_2$ at a subharmonic frequency $f_2$ from that of $f_1$ which will be delivered to the antenna 22 for transmission to the antenna 16 of the base system. A particular feature of the present invention to be noted with respect to FIG. 5 is that the transponder circuit 18 depicted therein is in fact passive in the sense that no external source of power is required for the desired generation of the $f_2$ frequency. Moreover, as aforementioned, the equivalent circuit depicted in FIG. 5 may be implemented in a number of manners well known in the art employing discrete or distributed components or combinations thereof. Still further, the particular values of the various components may be adjusted in accordance with good conventional electrical engineering practice well known in the art, dependent upon the desired frequencies of operation and the like.

Referring now to FIG. 6, an actual embodiment of the transponder system depicted in FIG. 5 will be seen. This transponder system of FIG. 6 has been adapted to receive a $S_1$ signal at a frequency $f_1$ and to generate by parasitic oscillation and transmit a signal $S_2$ at a frequency $f_2$ one-half that of the $f_1$ frequency. Moreover, this $S_2$ signal which is transmitted by the transponder circuit 18 of FIG. 6 as well as being generated from the energy of the $S_1$ signal received thereby will be phase coherent with the phase of the $S_1$ signal.

With more particular reference to the circuit of FIG. 6, a pair of toroidal coils 102 and 106 are provided each comprised of 11 turns of wire on T-37-6 cores available from the Amidon Company. These coils 102 and 106 are joined together at one end to a length of copper wire 110 nominally of a 3' length. Also interconnected to this junction of the coils 102 and 106 and one end of the wire 110 is one side of a variable tuning capacitance 100 having a nominal value of approximately 30 picofarads. Disposed between and electrically connected to the remaining two ends of the coils 102 and 106 is a varactor diode such as an RCA 3126 diode available from the Radio Corporation of America. The remaining end of the tuning capacitance 100 and an additional length of copper wire 108, also nominally of a 3' length, are interconnected to the cathode side of the varactor 104. Connected to the junction of the anode side of varactor 104 and coil 106 is a length of copper wire 122 nominally of 2 feet in length.

A problem has been noted with the previously described system with respect to range ambiguity and that several methods well known in the art may be incorporated into the system of the present invention for resolving such ambiguity including bi-phase modulation, pseudo-random code modulation, FM or AM modulation.

A representative such technique employing AM modulation will now be described with respect to the embodiment depicted in FIG. 2. A modulator 24 may be included in the comparator circuit 12 of the base system. This modulating oscillator contained within the circuit 24 may be tuned, for example, between 1/1000 $f_1$–1/10 $f_1$ whereby a modulator oscillating control signal 25 of such frequency will be delivered to the modulation control 26. This will result in an AM modulation control signal 27 within the aforementioned frequency range to be delivered to the transmitter 28 which generates the $S_1$ signal at the $f_1$ frequency. Accordingly, still referring to FIG. 2, the $S_1$ signal at the frequency $f_1$ amplitude modulated by the control signal 27 within the aforementioned frequency range will be delivered as signal 29 to the diplexer 30, and thence on the transmission line 31 to the antenna 32 for broadcast to the transponder 18. Thus, the system of FIG. 2 will be seen to correspond to that of FIG. 4 in the sense that the $S_1$ signal transmitted on the antenna 32 corresponds to the $S_1$ signal transmitted on the antenna 14, the difference being that the $S_1$ signal with respect to the system of FIG. 2 has been amplitude modulated in the aforementioned manner.

The receiver 34 of the system in FIG. 2 may include, in addition to the previously described receiver channel for detecting the $S_2$ signal, a second receiver channel. This second receiver channel will preferably be comprised of a linear amplifier with built in automatic gain control, followed by an AM detector, and then a limiting amplifier, the output of this limiting amplifier being delivered as signal 35 to the modulator/processor 24. Internal to the circuit 24, a start/stop counter or time delay measurement circuit may be provided having, as its inputs, the aforementioned AM modulator frequency control signal 25 as well as the output to the limiter amplifier. The output of this start/stop counter may be used as a direct measurement of range. This range measurement, it will be noted, is only accurate to within $\lambda_1/2$ and only needs to be so accurate inasmuch as the other previously described circuitry provides range resolution for magnitudes less than $\lambda_1/2$.

The aforementioned modulation frequency may be selected in accordance with standard well known techniques based upon the maximum range measurement requirement desired for this system, the signal-to-noise ratio available in the receiver 34 (a higher signal-to-noise ratio allowing for a lower required AM modulation frequency), and the measurement resolution capability of the start/stop counters. In the particular embodiment herein described wherein $f_1 = 30.01$ MHz, a modulation frequency of $1/100$ $f_1$ may be employed resulting in an unambiguous range of approximately 1600', this modulation frequency being approximately 300 kHz. It will be noted that the aforementioned techniques for resolving range ambiguity do not modify or change the general construction and operation of the system of the present invention as previously described.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. A method for determining distance "d" between first and second locations, comprising:
    generating at said first location a first electromagnetic wave $S_1$ at a frequency $f_1$;
    transmitting said $S_1$ from said first location to said second location;
    receiving said $S_1$ at said second location;
    passively generating from said received $S_1$ using energy solely from said received $S_1$ at said second location a second electromagnetic wave $S_2$ phase-coherent with said received $S_1$ and at a subharmonic frequency $f_2$ of said $f_1$ frequency;
    transmitting said $S_2$ from said second location to said first location;
    receiving said transmitted $S_2$ at said first location; and
    deriving a measurement signal corresponding to the magnitude of phase difference between said transmitted $S_1$ and said received $S_2$ signals.

2. The method of claim 1, wherein $f_2 = \frac{1}{2} f_1$.

3. The method of claim 1, wherein
said transmitted $S_1$ is of the form $$S_1 = \cos(\omega_1 + \Delta\omega_1)t;$$

said received $S_1$ is of the form $$S_1 = \cos\left[(\omega_1 + \Delta\omega_1)t - \frac{2\pi d}{\lambda_1}\right];$$

said transmitted $S_2$ is of the form $$S_2 = \cos\left[\frac{(\omega_1 + \Delta\omega_1)t}{2} - \frac{\pi d}{\lambda_1}\right];$$

said received $S_2$ is of the form $$S_2 = \cos\left[\frac{(\omega_1 + \Delta\omega_1)t}{2} - \frac{2\pi d}{\lambda_1}\right];$$

said phase difference magnitude is of the form $$\phi = \frac{2\pi d}{\lambda_1}; \text{ and}$$

t = time
$\phi$ = said magnitude of phase difference
$\omega_1 = 2\pi f_1$
$\lambda_1$ = free space wavelength of $f_1$.

4. The method of claim 1, wherein said transmitted and received signals $S_1$ and $S_2$, respectively, are continuous waves.

5. The method of claim 4, wherein said transmitted and received signals $S_1$ and $S_2$, respectively, are sinusoidal waves.

6. Apparatus for determining distance "d" between first and second locations, comprising:
 first generator means for generating at said first location a first electromagnetic wave $S_1$ at a frequency $f_1$;
 first transmitter means for transmitting said $S_1$ from said first location to said second location;
 first receiving means for receiving said $S_1$ at said second location;
 second generator means for passively generating from said received $S_1$ using energy solely from said received $S_1$ at said second location a second electromagnetic wave $S_2$ phase-coherent with said received $S_1$ and at a subharmonic frequency $f_2$ of said $f_1$ frequency;
 second transmitter means for transmitting said $S_2$ from said second location to said first location;
 second receiving means for receiving said transmitted $S_2$ at said first location; and
 phase detector means for deriving a measurement signal corresponding to the magnitude of phase difference between said transmitted $S_1$ and said received $S_2$ signals.

7. The apparatus of claim 6, wherein said second generator means generates said $S_2$ at said subharmonic frequency $f_2 = \frac{1}{2} f_1$.

8. The apparatus of claim 6, wherein said transmitted $S_1$ is of the form $$S_1 = \cos(\omega_1 + \Delta\omega_1)t;$$

said received $S_1$ is of the form $$S_1 = \cos\left[(\omega_1 + \Delta\omega_1)t - \frac{2\pi d}{\lambda_1}\right];$$

said transmitted $S_2$ is of the form $$S_2 = \cos\left[\frac{(\omega_1 + \Delta\omega_1)t}{2} - \frac{\pi d}{\lambda_1}\right];$$

said received $S_2$ is of the form $$S_2 = \cos\left[\frac{(\omega_1 + \Delta\omega_1)t}{2} - \frac{2\pi d}{\lambda_1}\right];$$

said phase difference magnitude is of the form
$\phi = 2\pi d/\lambda_1$; and
t = time
$\phi$ = said magnitude of phase difference
$\omega_1 = 2\pi f_1$
$\lambda_1$ = free space wavelength of $f_1$.

9. The apparatus of claim 6, wherein said first and second generator means generate continuous electromagnetic waves at said $f_1$ and said $f_2$ frequencies, respectively.

10. The apparatus of claim 9, wherein said elecromagnetic waves are sinusoidal.

11. Apparatus for determining distance, comprising:
 a base system means for transmitting signal $S_1$ at frequency $f_1$ and for receiving signal $S_2$ at frequency $f_2$, respectivly, where said $f_2$ is a subharmonic of $f_1$ and for measuring phase difference between said transmitted $S_1$ and received $S_2$ signals; and
 a transponder system comprising:
  a capacitor;
  a first inductor,
   said capacitor and said first inductor being electrically interconnected in parallel to define first and second electrical junctions;
  a varactor diode having first and second ends;
  a second inductor having first and second ends,
   said first end of said diode being electrically interconnected to said first junction,
   said second end of said diode being electrically interconnected to said first end of said second inductor,
   said second end of said inductor being electrically connected to said second junction;
  a first length of wire electrically interconnected at one end of said first junction;
  a second length of wire electrically interconnected at one end of said second junction; and
  a third length of wire electrically interconnected at one end of said second end of said diode and said first end of said second inductor.

12. The apparatus of claim 11, wherein said capacitor is a variable tuning capacitor.

13. Apparatus for determining distance, comprising:
 a base system means for transmitting signal $S_1$ at frequency $f_1$ and for receiving signal $S_2$ at frequency $f_2$, respectively, where said $f_2$ frequency is a subharmonic of $f_1$ and for measuring phase difference between said transmitted $S_1$ and received $S_2$ signals; and
 a transponder system comprising:
  a receiving antenna means for receiving said transmitted $S_1$;
  a transmitting antenna means for transmitting said $S_2$ 2;
  a first resonant circuit means resonating at said $f_1$ frequency electrically interconnected in series between said transmitting and said receiving antennas;

a second resonant circuit means resonating at said $f_2$ frequency;

a varactor diode, said diode and said second resonant circuit means being electrically interconnected in series terminating at first and second ends, said first end of said series circuit being interconnected to one of said transmitting or receiving antennas and said second end of said series circuit being interconnected to the remaining one of said transmitting or receiving antennas.

14. A method for determining the distance "d" between first and second locations, comprising:

generating a signal $S_a$ of the form $$S_a = \cos \frac{\omega t}{2};$$

transforming said $S_a$ into a signal $S_b$ of the form $$S_b = \cos(\omega + \Delta\omega)t;$$

transmitting said $S_b$ from said first location toward said second location;

receiving at said second location in response to said transmitted $S_b$ a signal $S_c$ of the form $$S_c = \cos\left[(\omega + \Delta\omega)t - \frac{2\pi d}{\lambda}\right];$$

transforming said $S_c$ to a signal $S_d$ of the form $$S_d = \cos\left[\frac{(\omega + \Delta\omega)t}{2} - \frac{\pi d}{\lambda}\right];$$

transmitting said $S_d$ from said second location toward said first location;

receiving at said first location in response to said transmitted $S_d$ a signal $S_e$ of the form $$S_e = \cos\left[\frac{(\omega + \Delta\omega)t}{2} - \frac{2\pi d}{\lambda}\right];$$

transforming said $S_e$ into a signal $S_f$ of the form $$S_f = \cos\left[\frac{\Delta\omega t}{2} - \frac{2\pi d}{\lambda}\right];$$

mixing said $S_a$ and $S_f$ to derive a first mixer output $S_g$;

transforming said $S_g$ into a signal $S_h$ of the form $$S_h = \cos\left[\frac{\Delta\omega t}{2} - \frac{2\pi d}{\lambda}\right];$$

transforming said $S_h$ into a signal $S_i$ of the form $$S_i = \cos(\omega t);$$

mixing said $S_i$ and said $S_b$ to derive a second mixer output $S_j$;

transforming said $S_j$ into a signal $S_k$ of the form $$S_k = \cos \frac{\Delta\omega t}{2};$$

generating a phase difference signal corresponding to the magnitude of the difference between the phases of said $S_h$ and $S_j$.

15. The method of claim 14, further including the steps of:

deriving a correction constant factor for correlating said phase difference signal to said distance "d";

multiplying said phase difference signal by said correction factor;

generating a distance signal in response to said multiplication; and displaying a visual indication of the magnitude of said distance signal as an indication of said distance "d".

16. The method of claim 15, wherein said step of transforming said $S_e$ into $S_f$ comprises filtering said $S_e$.

17. The method of claim 16, wherein said step of transforming said $S_g$ into $S_h$ comprises filtering said $S_g$.

18. The method of claim 14, wherein said step of generating a phase difference signal comprises:

generating a plurality of reference time pulses;

detecting a 0 crossing of said $S_h$;

detecting a 0 crossing of said $S_j$; and counting a portion of said timing pulses occurring between said detected 0 crossings.

* * * * *